(12) United States Patent
Hjulstad

(10) Patent No.: US 11,047,223 B2
(45) Date of Patent: Jun. 29, 2021

(54) INTERFACE AND INTEGRATION METHOD FOR EXTERNAL CONTROL OF DRILLING CONTROL SYSTEM

(71) Applicant: EQUINOR ENERGY AS, Stavanger (NO)

(72) Inventor: Åsmund Hjulstad, Stavanger (NO)

(73) Assignee: EQUINOR ENERGY AS, Stavanger (NO)

( * ) Notice: Subject to any disclaimer, the term of this patent is extended or adjusted under 35 U.S.C. 154(b) by 0 days.

(21) Appl. No.: 16/303,927

(22) PCT Filed: May 22, 2017

(86) PCT No.: PCT/NO2017/050124
§ 371 (c)(1),
(2) Date: Nov. 21, 2018

(87) PCT Pub. No.: WO2017/204655
PCT Pub. Date: Nov. 30, 2017

(65) Prior Publication Data
US 2019/0178074 A1 Jun. 13, 2019

(30) Foreign Application Priority Data
May 23, 2016 (GB) .................... 1609037

(51) Int. Cl.
*E21B 44/00* (2006.01)
*G05B 19/05* (2006.01)
(Continued)

(52) U.S. Cl.
CPC ............. *E21B 44/00* (2013.01); *E21B 44/04* (2013.01); *G05B 17/02* (2013.01); *G05B 19/05* (2013.01); *G09B 7/02* (2013.01)

(58) Field of Classification Search
CPC ...................................................... E21B 44/00
See application file for complete search history.

(56) References Cited

U.S. PATENT DOCUMENTS

| | | | |
|---|---|---|---|
| 4,903,245 A | * | 2/1990 | Close .................. E21B 12/02 340/853.3 |
| 5,791,410 A | | 8/1998 | Castille et al. |

(Continued)

FOREIGN PATENT DOCUMENTS

| | | | | |
|---|---|---|---|---|
| FR | 3 190 433 A1 | * | 8/2014 | ............. G01V 3/32 |
| WO | WO 2010/101473 A1 | | 9/2010 | |

(Continued)

OTHER PUBLICATIONS

S. Odegård et al., "Advanced Dynamic Training Simulator for Drilling as Well as Related Experience from Training of Drilling Teams with Focus on Realistic Downhole Feedback", Mar. 5-7, 2013, SPE/IADC Drilling Conference and Exhibition. (Year: 2013).*

(Continued)

*Primary Examiner* — Mohammad Ali
*Assistant Examiner* — Kelvin Booker
(74) *Attorney, Agent, or Firm* — Birch, Stewart, Kolasch & Birch LLP

(57) ABSTRACT

A method of controlling a borehole drilling process including a first set of operations and a second set of operations includes generating and outputting at least one control signal by a drilling control system for controlling at least one control parameter associated with the first set of operations; and, subsequent to an indication that the first set of operations is complete, outputting at least one control signal received from an external system at the drilling control system for controlling at least one control parameter associated with the second set of operations.

17 Claims, 2 Drawing Sheets

(51) Int. Cl.
  *G05B 17/02* (2006.01)
  *E21B 44/04* (2006.01)
  *G09B 7/02* (2006.01)

(56) References Cited

U.S. PATENT DOCUMENTS

| | | | | |
|---|---|---|---|---|
| 6,021,377 | A * | 2/2000 | Dubinsky | E21B 7/068 |
| | | | | 702/9 |
| 6,206,108 | B1 * | 3/2001 | MacDonald | E21B 49/005 |
| | | | | 175/24 |
| 7,128,167 | B2 | 10/2006 | Dunlop et al. | |
| 7,946,356 | B2 * | 5/2011 | Koederitz | E21B 47/13 |
| | | | | 175/40 |
| 8,097,567 | B2 * | 1/2012 | Wilson, Jr. | C09K 8/04 |
| | | | | 507/240 |
| 8,151,907 | B2 * | 4/2012 | MacDonald | E21B 10/003 |
| | | | | 175/95 |
| 8,196,678 | B2 | 6/2012 | Jeffryes | |
| 8,220,539 | B2 * | 7/2012 | Vinegar | H01C 3/00 |
| | | | | 166/247 |
| 8,561,720 | B2 * | 10/2013 | Edbury | E21B 21/08 |
| | | | | 175/26 |
| 8,798,978 | B2 * | 8/2014 | Ertas | E21B 44/00 |
| | | | | 703/10 |
| 8,977,523 | B2 * | 3/2015 | Ertas | E21B 44/00 |
| | | | | 703/2 |
| 9,249,655 | B1 | 2/2016 | Keast et al. | |
| 9,470,085 | B2 * | 10/2016 | Saunders | E21B 47/13 |
| 9,645,575 | B2 * | 5/2017 | Watson | E21B 41/0092 |
| 9,650,880 | B2 * | 5/2017 | Bowley | E21B 3/02 |
| 9,804,288 | B2 * | 10/2017 | Estes | G01V 3/26 |
| 9,850,708 | B2 * | 12/2017 | Bowley | E21B 3/025 |
| 9,850,728 | B2 * | 12/2017 | Wessel | E21B 17/206 |
| 9,938,191 | B2 * | 4/2018 | Pinkerton | C09K 8/50 |
| 10,113,408 | B2 * | 10/2018 | Pobedinski | E21B 21/08 |
| 10,697,261 | B2 * | 6/2020 | Henry | E21B 21/062 |
| 2004/0124012 | A1 | 7/2004 | Dunlop et al. | |
| 2008/0125876 | A1 | 5/2008 | Boutwell | |
| 2009/0055135 | A1 * | 2/2009 | Tang | E21B 10/54 |
| | | | | 703/1 |
| 2009/0132458 | A1 * | 5/2009 | Edwards | E21B 44/00 |
| | | | | 706/50 |
| 2010/0138159 | A1 | 6/2010 | Conquergood et al. | |
| 2011/0232966 | A1 * | 9/2011 | Kyllingstad | E21B 41/0092 |
| | | | | 175/24 |
| 2011/0280104 | A1 * | 11/2011 | McClung, III | E21B 3/02 |
| | | | | 367/82 |
| 2013/0186687 | A1 * | 7/2013 | Snyder | G09B 7/02 |
| | | | | 175/40 |
| 2013/0228328 | A1 | 9/2013 | Chapman | |
| 2014/0060931 | A1 | 3/2014 | Pettapiece et al. | |
| 2014/0291023 | A1 * | 10/2014 | Edbury | E21B 21/08 |
| | | | | 175/24 |
| 2014/0326505 | A1 | 11/2014 | Davis et al. | |
| 2015/0090498 | A1 * | 4/2015 | Hareland | E21B 45/00 |
| | | | | 175/48 |
| 2015/0101864 | A1 * | 4/2015 | May | E21B 10/32 |
| | | | | 175/27 |
| 2015/0211356 | A1 * | 7/2015 | Mercer | E21B 7/046 |
| | | | | 175/45 |
| 2015/0275646 | A1 * | 10/2015 | Benson | E21B 47/024 |
| | | | | 700/275 |
| 2015/0369031 | A1 | 12/2015 | Yang et al. | |
| 2016/0032705 | A1 * | 2/2016 | Benson | E21B 44/00 |
| | | | | 175/24 |
| 2016/0097270 | A1 * | 4/2016 | Pobedinski | E21B 44/00 |
| | | | | 700/275 |
| 2016/0245027 | A1 * | 8/2016 | Gumus | E21B 21/08 |
| 2017/0030181 | A1 * | 2/2017 | Thomas | E21B 44/00 |
| 2017/0107808 | A1 * | 4/2017 | Forstner | E21B 7/067 |

FOREIGN PATENT DOCUMENTS

| | | |
|---|---|---|
| WO | WO 2013/082498 A2 | 6/2013 |
| WO | WO 2016/053672 A1 | 4/2016 |

OTHER PUBLICATIONS

S. J. Kravits et al., "Accurate Directional Borehole Drilling: A Case Study at Navajo Dam, New Mexico", 1987. (Year: 1987).*

Siahaan et al., "An Adaptive PID Switching Controller for Pressure Regulation in Drilling", 2012, Proceedings of the 2012 IFAC Workshop on Automatic Control in Offshore Oil and Gas Production May 31-Jun. 1, 2012. Trondheim, Norway (Year: 2012).*

Godhavn et al., "Drilling seeking automatic control solutions", 2011, Proceedings of the 18th World Congress the International Federation of Automatic Control Milano (Italy) Aug. 28-Sep. 2, 2011. (Year: 2011).*

Bardaj et al., "Continuous Circulation System:A Key to drilling safety increment", Jul. 2016, 3rd Intl. Conf. on Research in Science and Technology. (Year: 2016).*

British Office Action for British Application No. GB1609037.5, dated Aug. 2, 2019.

International Search Report, issued in PCT/NO2017/050124, , dated Aug. 11, 2017.

United Kingdom Combined Search and Examination Report, issued in Priority Application No. 1609037.5, dated Nov. 17, 2016.

Written Opinion of the International Searching Authority, issued in PCT/NO2017/050124, dated Aug. 11, 2017.

* cited by examiner

INTERFACE AND INTEGRATION METHOD FOR EXTERNAL CONTROL OF DRILLING CONTROL SYSTEM

TECHNICAL FIELD

The present invention relates to an interface and an integration method for the external control of a drilling control system used in the construction of a hydrocarbon well.

BACKGROUND

In a process of drilling a hydrocarbon well, above-ground operations and downhole operations are typically controlled using a drilling control system; above-ground operations may include setting slips to hold a drillstring while a new section is added to the drillstring, and downhole operations (which are typically performed when the drillstring is not held by slips, i.e., when the drillstring is "out-of-slips") might include adjusting the rotational speed of the drill or the rate at which fluid is pumped down-hole. The drilling control system may be controlled by a human operator. Downhole and/or above-ground operations may also be automated or controlled externally, with the aim of increasing the safety and efficiency of the drilling process.

External, automated control of drilling control system pumps is common in systems for communicating with downhole tools via the variation of pump flow rates (i.e., downlinking); the Cyberlink technology produced by NOV is an example of such a system. U.S. Pat. No. 8,196,678 discloses a method of downlinking to a downhole tool located in a borehole. However, such downlinking interfaces do not give the ability to control average flow rate over time, or the ability to fully stop or start the pumps.

There are also external interfaces for the optimisation of parameters relating to rate-of-penetration. For example, US20150369031 discloses techniques for optimizing automated drilling processes, using different models for different parts of a formation to be drilled. However, such optimisation interfaces are tailored for optimisation of on-bottom drilling, and are not suitable for the whole range of activities performed while out-of-slips.

U.S. Pat. No. 7,128,167 discloses a method and system for automatically detecting the state of a drilling rig during the drilling process of a wellbore, such that a prediction of the next rig state can be derived from current state probabilities and transition probabilities, and a driller may, for example, be reminded not to change into a particular rig state if that rig state is undesirable and its probability as a next rig state is high.

WO2016053672 discloses an absolute time reference-based control system for well construction automation, where the operation of devices is synchronized to a common time reference so that actions to be performed automatically or manually may be limited or inhibited during specific time intervals or at specific times.

Existing technologies for the automation or external control of the drilling process provide a fragmented solution to improving the efficiency and safety of the drilling process, and do not allow full control of drilling parameters and processes.

SUMMARY

It is an object of the present invention to overcome, or at least mitigate the problems identified above. This object is achieved by enabling external control of the mechanical and hydraulic top-of-string boundary in a borehole drilling process, while enabling a clear, reasonable and useful separation of responsibility between a drilling control system and an external automated drilling control system.

In accordance with a first aspect of the present invention there is provided a method of controlling a borehole drilling process comprising a first set of operations and a second set of operations, the method comprising: generating and outputting at least one control signal by a drilling control system for controlling at least one control parameter associated with the first set of operations; and, subsequent to an indication that the first set of operations is complete, outputting at least one control signal received from an external system at the drilling control system for controlling at least one control parameter associated with the second set of operations.

The first set of operations may comprise batch tasks. The second set of operations may comprise downhole processes.

The first set of operations may be performed while a drillstring is held in slips. The second set of operations may be performed while a drillstring is not held in slips.

The method may comprise, prior to outputting the at least one control signal received from the external system, sending a start signal to the external system, wherein the start signal is set to True. The True start signal may comprise a request to the external system to send at least one control signal for controlling at least one control parameter associated with the second set of operations, and a promise to the external system that the first set of operations is complete.

The method may further comprise, prior to outputting the at least one control signal received from the external system, receiving at the drilling control system a ready signal from the external system, wherein the ready signal is set to True, and the True ready signal indicates that the external system is active and is able to provide at least one control signal.

The indication that the first set of operations is complete may comprise one or more of: an indication that a drillstring is connected to one or more drilling machines; an indication that a drillstring has been released from slips and the drillstring has been lifted out of slips; and an indication that a flow path from one or more pumps is open.

The at least one control parameter associated with the second set of operations may comprise at least one of: vertical velocity of a drillstring; rotational velocity of a drillstring; and fluid flow rate at a top-of-string position.

The method may further comprise ceasing the outputting of the at least one control signal received from the external system subsequent to receiving at the drilling control system a complete signal from the external system, wherein the complete signal is set to True, and the True complete signal indicates that the second set of operations is complete.

The drilling control system may not filter the at least one control signal received from the external system.

The drilling control system may be configured to apply one or more safety limits to control signals outputted by the drilling control system. The one or more safety limits may relate to the safety of one or more topside drilling machines and/or pumps. The drilling control system may be configured to cease the outputting of, or temporarily limit, the at least one control signal received from the external system based on or in response to the at least one control signal received from the external system exceeding the one or more safety limits applied by the drilling control system.

The method may further comprise sending by the drilling control system measurement data relating to the second set of operations to the external system or an external safety system. The method may further comprise receiving at the drilling control system one or more safety signals from the external system or the external safety system, wherein the one or more safety signals are related to the second set of operations and are based at least in part on the measurement data sent by the drilling control system. The one or more safety signals received from the external system or the external safety system may relate to functions that reduce the risk, probability, or consequence of undesirable downhole events or conditions. The method may further comprise ceasing the outputting of, or temporarily limiting, the at least one control signal received from the external system based on or in response to the one or more safety signals received from the external system or the external safety system.

In accordance with a second aspect of the present invention there is provided a drilling control system for controlling a borehole drilling process, the borehole drilling process comprising a first set of operations and a second set of operations, the apparatus comprising: a control unit for generating at least one control signal for controlling at least one control parameter associated with the first set of operations; an output unit for outputting said at least one control signal to borehole drilling apparatus; and wherein the drilling control system is configured, subsequent to an indication that the first set of operations is complete, to output at least one control signal received from an external system at the drilling control system for controlling at least one control parameter associated with the second set of operations.

DETAILED DESCRIPTION

Figure 1:
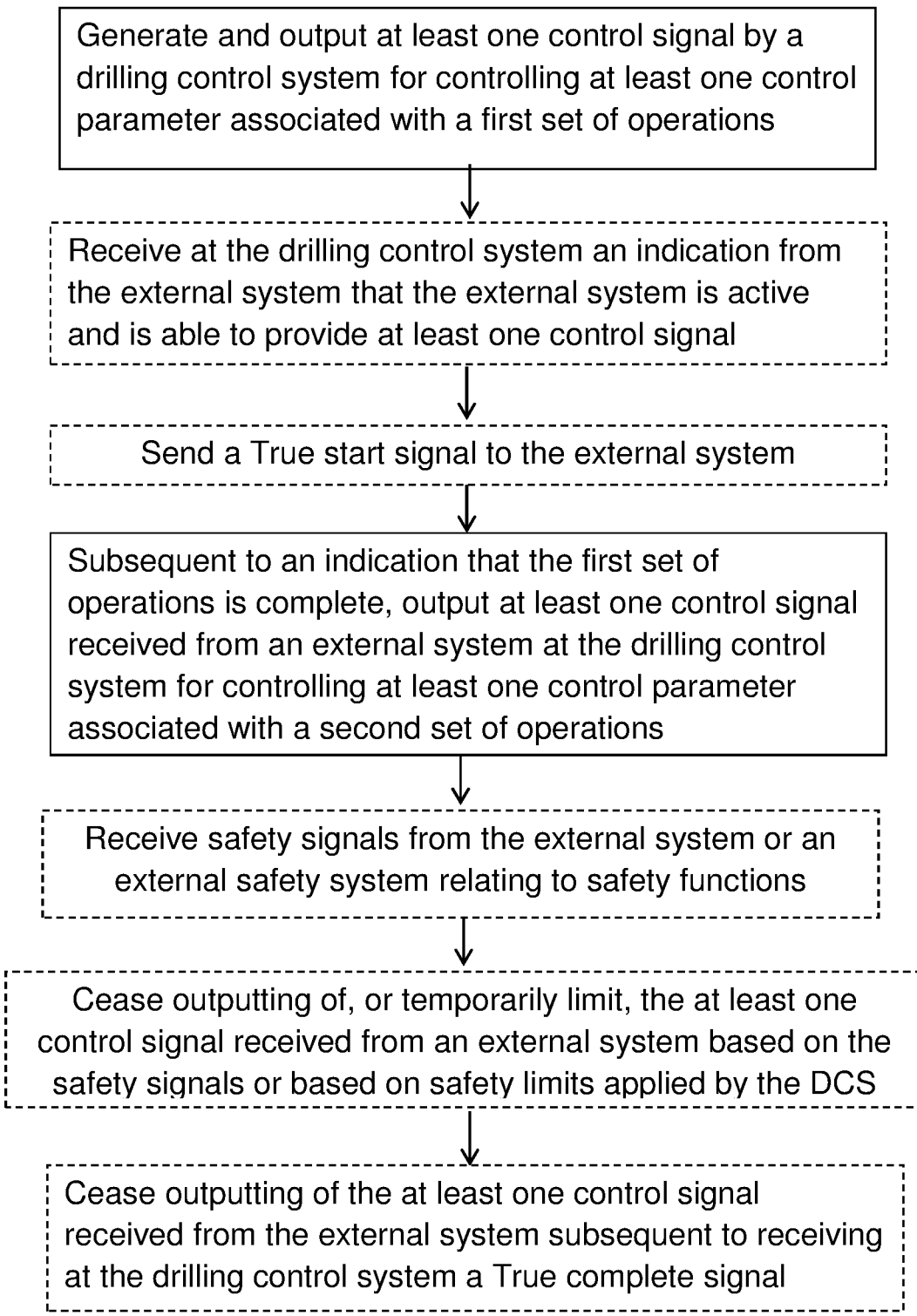
FIG. 1 is a flow diagram illustrating a method of controlling a borehole drilling process in accordance with an embodiment of the invention.

The process of constructing a well alternates between batch activities performed above ground—setting slips, moving pipe, and making-up the drillstring—and the downhole, continuous activities of moving the drillstring and pumping fluid.

The specifics of the above-ground batch process steps, for example setting slips, assembling pipe, building or laying down bottom-hole assemblies, may vary according to the type and configuration of topside equipment. The processes taking place in the hole, for example drilling new formations, circulating solids out of the hole, directional drilling or taking measurements, depend to a much lesser degree on the type and configuration of topside equipment, and are rather influenced by the drillstring and bottom-hole assembly, wellbore and formation.

When performing batch, slips-to-slips tasks, i.e., tasks carried out in between setting slips and releasing slips, the goal of fast execution is unambiguous. The responsibility for optimising this batch process lies with the drilling crew and the drilling control system vendor. Everything related to batch, slips-to-slips tasks is outside of scope for control of the downhole drilling process.

After slips have been released, good execution of the downhole drilling process involves steering, rate of penetration (ROP) optimisation, friction tests, mitigation of drillstring vibration, and other activities. The automatic execution of these activities provides consistency, faster execution and improved quality in the downhole drilling process.

Different control systems exist for controlling the downhole drilling process, but the downhole drilling process itself varies little. The drillstring moves vertically, rotates and fluid is pumped into the drillstring. The vertical and rotational movement of the drillstring may be achieved using drilling machines: the vertical movement may be achieved using a hoisting machine (draw-works), and the rotational movement may be achieved using a rotation machine (top-drive). The majority of control activities in the downhole drilling process involve only the manipulation of the drillstring in these three domains.

The inventors have recognised that batch tasks and downhole drilling processes have different characteristics, and that it may be useful to separate the responsibilities for these two parts of the drilling process and assign them to different systems.

Drilling equipment is typically controlled by a local drilling control system (DCS), operated by the driller. Functions addressing the downhole processes may be controlled in a separate system or systems external to the DCS; this external system (or systems) is referenced here as an automated drilling control (ADC) system.

This document describes a simplified interface allowing for continuous control of the hoisting, rotation and pumping into the drillstring from an external system.

Coordination between the DCS and the ADC—that is, coordination between control of batch processes by the DCS and control of continuous, downhole processes by the ADC—may be accomplished using the following coordination signals:

Ready—A 'ready' signal from the ADC signifies that the ADC is active and can provide useful control signals. The ready signal may be a Boolean signal that is true when the DC is active and is ready to send control signals to the DCS.

Start—This Boolean signal from the DCS is true when the batch activities are completed and the continuous, in-hole processes should resume. The start signal represents a promise from the DCS to the ADC that the following statements are true: the drill-string is connected to the drilling machines (in particular, the top-drive), the flow path from the mud pumps is open and that the slips have released (including that the string has been lifted out of slips). The start signal remains true as long as the ADC is in control. The start signal from the DCS signifies that the DCS system, by action of the driller or otherwise, requests the ADC system to assume control of the agreed machines or pumps.

Alternatively, the start signal may represent a promise from the DCS to the ADC that one or more of the following statements is true: the drill-string is connected to the drilling machines (in particular, the top-drive), the flow path from the mud pumps is open and that the slips have released (including that the string has been lifted out of slips). In this case a plurality of start signals may be sent from the DCS to the ADC, each start signal requesting the ADC to assume control of the agreed machine or pump relevant to the promise from the DCS to the ADC.

Completed—This Boolean signal from the ADC is true when the continuous downhole processes have completed, and the ADC desires to relinquish control back to the DCS.

These coordination signals may relate to individual machines or pumps, or groups of machines or pumps. The coordination signals are time-continuous signals that are sent continuously from the DCS to the ADC (for the start signal) or from the ADC to the DCS (for the ready signal and the completed signal). Alternatively, the coordination signals may be non-time-continuous signals that are sent once, or at pre-determined time intervals.

The split between DCS and ADC responsibility may be according to slips status. The DCS may control the setting of slips, the un-setting of slips, and all topside steps in between. The ADC system may address sub-processes like friction tests, hole-cleaning, drill-off, going on bottom and on-bottom drilling, all activities performed when slips are not set.

One may note that the main link between the topside machinery and downhole processes is through the connection between topside machinery and the top of the drillstring. At this top-of-string boundary, the drillstring is coupled to the vertical motion of the hoisting machinery, the rotational motion of the machine rotating the drillstring and the pumping of fluids by pumps on the rig.

ADC functions may require controlling the state at the mechanical (vertical and rotational motion) and hydraulic top-of-string boundary to achieve the desired downhole functions. This requires a suitable control interface (i.e., an ADC/DCS interface) on the DCS.

To limit the complexity of the ADC/DCS interface and enable a clear separation of responsibility between the DCS and the ADC, the control signals on the ADC/DCS interface (i.e., the control signals that the DCS is able to receive from the ADC at the ADC/DCS interface) should preferably include only those signals necessary for influencing downhole conditions, i.e., one or more of the signals required to control the states at the top-of-string boundary.

An ADC/DCS interface on the DCS that allows this could receive the following control signals from the ADC:
vertical velocity
rotational velocity
flow rate at top-of-string The control signals received from the ADC may be desired quantities with explicit or agreed engineering units or may be approximate or non-dimensional signals related to the physical property, such as for example a number between −1 and 1, a revolutions-per-minute value, a desired stroke frequency or flow rate.

The control signals received by the DCS from the ADC comprise control commands. The control commands may comprise:
Hoisting command (controlling vertical velocity). The hoisting command may comprise a signed floating point value, with positive meaning upwards movement of top-of-string. The magnitude may be proportional to hoisting speed. The command may be used directly as a velocity command to the drawworks or used as setpoint to a block velocity controller, if such exists. It is preferably interpreted as block velocity with unit meter per second. (Note: This specification implies that it is optional for the drilling control system to compensate for layer thickness on the drawworks drum or type of block.)
Rotation command (controlling rotational velocity). The rotation command may comprise a signed floating point value, proportional to drillstring rotational velocity. The command may be used directly as a velocity command to the derrick drilling machine/top drive. The command may be used as a desired average drillstring rotation if torsional vibration mitigation functions are active in the local machine control system. The rotation command is preferably interpreted as number of rotations per second.
Pumping command (controlling flow rate at top-of-string). The pumping command may be a non-negative floating point value, proportional to combined stroke rate from the mud pumps. The pumping command is preferably interpreted as number of strokes per second (not necessarily integer).

The control signals may be sent as analogue, hardwired signals, using field-bus type digital communication, or across a computer network.

As an alternative to controlling flow rate at top-of-string, one may instead send control signals designated for individual pumps.

In some systems, there may also be a facility for influencing the pressure or flow level in the annulus of the well or riser. This adds an additional state at the hydraulic boundary of the well. The ADC/DCS interface may be extended to include this, or this control functionality may be provided by a system external to the drilling control system. The ADC/DCS interface may provide the ability to control position, flow volume, acceleration, force/torque or power at or near the top-of-string boundary. That is, the ADC or another external system may control the pressure or flow level in the annulus of the well or riser, and may control position, flow volume, acceleration, force/torque or power at or near the top-of-string boundary.

The DCS may provide available measurement data relating to downhole processes and/or topside measurements to the ADC. The available measurement data may relate to variables including:
Top-of-string motion (position, velocity, acceleration)
Drawworks rotation (position, velocity, acceleration)
Additional drawworks information: layer number
Top-of-string rotation (position and velocity)
Standpipe pressure
Combined pump rate
For individual HP pumps: pump rate, liner size and efficiency (if available), if pump is assigned for automatic control
Slips command, measurements if available.

As a general principle, measurement data for as many variables as is practical may be made available to the ADC, to allow for the easy development of additional functionalities.

Although the DCS receives control signals from the ADC as described above, the DCS may still retain responsibility for machine integrity and topside equipment safety, and may assume control of all machines if deemed necessary due to a specific event, condition or user input.

During some operations, such as tripping in or out of hole, the process is dominated by topside activities, and only to a limited extent influenced by downhole conditions. In this case, the ADC or another external system may instead provide motion limits or advice on downhole conditions as signals to an automatic system or function within the DCS, or as guidance to a human operator.

Systems external to the DCS, within a dedicated ADC system or in a third system, may also provide functions addressing the probability of, or consequences of, undesirable downhole events or conditions. The DCS may enable such functions by enabling the ADC/DCS interface to receiving a set of safety signals with state limits to be enforced. The DCS system may also receive trigger levels and/or behaviour configuration parameters for triggered functions.

During some operations, it may be beneficial to provide closed-loop control of a top-of-string boundary state, for example hook load or rotational power. This may be accomplished by locating a control computer or PLC near the existing DCS or actual equipment under control. The control computer may be a part of the ADC. The control computer can have responsibility for more high-frequency or low-latency control functions that may be unsuitable for implementation on general purpose computers but are still desirable to keep outside of the main DCS for reasons such as modularity, vendor independence, or as a modification to an existing DCS.

The ADC/DCS interface on the DCS may be suitable for closed loop control of the drilling machines. This implies requirements to roundtrip latencies and transmission reliability. Industrial Ethernet or field bus is preferred. The latency requirement should not be exaggerated, however, as both system dynamics and the required response time is fairly low. (In drilling mode, vertical motion seldom exceeds 0.5 m/s.)

To avoid increases in latency, it may be a requirement that the DCS does not filter any signals provided to or received from the ADC. If such a requirement is set, all machine limits, or limits otherwise set in the DCS, may still be applied. In particular, safety limitations set in the DCS may still be applied, where the safety limitations set in the DCS may relate to the safety of topside machines and people.

FIG. 1 shows a flow chart illustrating part of a borehole drilling process, and more specifically a handover of control of the borehole drilling process from the DCS to an external system, where the external system may be an ADC or ADCs.

The borehole drilling process may include above-ground batch tasks (a first set of operations) in addition to downhole continuous drilling processes (a second set of operations). Batch tasks may be defined as tasks that are performed when the drillstring is held in slips. Examples of batch tasks include stand-building, horizontal and vertical pipe-handling, make-up and break-out of tubulars, filling of pipe, and operation of valves (e.g., the standpipe bleed-off valve) and mud pumps. Downhole continuous drilling processes may be defined as processes that are performed when the drillstring is not held in slips. Examples of downhole continuous drilling processes include drilling new formations, circulating solids out of the hole, directional drilling, taking measurements, moving the drillstring and pumping fluids. It is noted that the borehole drilling process may also include processes that do not necessarily fit into the categories of batch tasks and downhole continuous drilling processes; for example, the borehole drilling process may include tripping in or out of hole, which involves the repeated setting and un-setting of slips, and may involve the pumping of fluid downhole and/or rotation of the drillstring.

The borehole drilling process is initially controlled by the DCS. The control by the DCS comprises the outputting of control signals generated by the DCS; the control signals generated by the DCS are typically for controlling batch tasks, but may be for controlling downhole continuous drilling processes or other processes. The batch-task control signals generated by the DCS are for controlling at least one control parameter associated with the batch tasks. The control parameters associated with the batch tasks are for controlling drillstring-handling machinery, which includes all the machines on or near the drillfloor. The drillstring-handling machinery may include drawworks (controlling vertical motion), topdrive (controlling rotational motion), iron roughneck, mud bucket, slips, and horizontal and vertical pipe-handling equipment. The control parameters associated with the batch tasks may be the position, velocity/speed, acceleration, or torque of the drillstring-handling machinery. The DCS or the ADC/DCS interface may receive a ready signal from ADC while the DCS is controlling the borehole drilling process; the DCS may also receive control signals from the ADC, and the DCS may take no action based on or in response to the control signals or the ready signal received from the ADC.

When the start signal is true, control of one or more downhole drilling processes is delegated from the DCS to the ADC. The start signal is set to true based on an indication that the batch activities (the first set of operations) are complete; the indication is an indication that one or more of the following statements is true: the drill-string is connected to the drilling machines (in particular, the topdrive), the flow path from the mud pumps is open, and the slips have released (including that the string has been lifted out of slips). In particular, a determination is made at the DCS that the batch activities are complete based on machine signals received at the DCS from one or more drilling machines or pumps. The determination may be performed at a processor of the DCS. The indication that the batch activities are complete is generated as a result of the determination, and the indication is sent to the ADC/DCS interface of the DCS. The start signal is then set to true at the ADC/DCS interface of the DCS. The start signal is sent from the ADC/DCS interface of the DCS to the ADC. Alternatively, the indication may be an indication that one or more batch activities are complete, with one or more determinations having been made for generating the corresponding one or more indications; in this case, each of a plurality of start signals may be set to true based on one of the one or more indications, and the plurality of start signals may be sent from the ADC/DCS interface of the DCS to the ADC.

In an alternative embodiment, the determination that the (or one or more) batch activities are complete generates an alert signal that is sent to the driller. The alert signal may trigger a visual or aural alert to the driller. The driller then requests that control is handed over from the DCS to the ADC; the driller's request may take the form of a manual action such as pressing a button. Following the driller's request, the indication that the batch activities are complete (or that one or more batch activities is complete) is sent to the ADC/DCS interface of the DCS, and the start signal is set to true.

A 'true' start signal sent from the ADC/DCS interface of the DCS to the ADC requests the ADC to assume control of the agreed one or more machines and pumps; such a request is also a request for the ADC to begin sending control signals to the DCS. The start signal being true may also trigger an instruction to a DCS/machines interface of the DCS to output control signals received from the ADC.

It may be a requirement that the ready signal sent from the ADC to the DCS is true for said control to be delegated from the DCS to the ADC.

The delegating of control from the DCS to the ADC involves handing over control of at least one continuous-process drilling parameter (where such continuous-process drilling parameters include one or more of vertical velocity, rotational velocity, pumping rate at top-of-string, position, flow volume, acceleration, force/torque and power) controlling downhole drilling processes from the DCS to the ADC. In this context, the handing over of control from the DCS to the ADC does not necessarily mean that the DCS was actively controlling the at least one continuous-process drilling parameter before the handover; for example, the ADC may control a rotation parameter after handover that was not actively controlled by the DCS during the batch tasks being performed before handover. Alternatively, after handing over control of the at least one continuous-processing drilling parameter from the DCS to the ADC, the DCS may output control signals received from the ADC instead of control signals generated by the DCS for controlling the at least one continuous-processing drilling parameter. Control of one or more of a plurality of continuous-process drilling parameters may be delegated to a first ADC, with control of one or more of the other continuous-process drilling parameters being delegated to a second ADC. Control of all continuous-process drilling parameters may be delegated from the DCS to the ADC.

Following the delegating of control of the one or more continuous-process drilling parameters from the DCS to the one or more ADCs, at least one control signal received from the ADC at the ADC/DCS interface at the DCS is then outputted by the DCS for controlling the at least one control parameter of the downhole continuous drilling processes, and hence controlling the borehole drilling process. In this way at least one control parameter of the downhole continuous drilling processes may be controlled by the ADC. The DCS may continue to output control signals generated by the DCS while control signals received from the ADC are outputted by the DCS to control the downhole continuous drilling processes.

The DCS may provide available measurement data relating to downhole processes and/or topside measurements to the ADC or an external safety system, before and/or after control of the at least one continuous-process drilling parameter is delegated from the DCS to the ADC. While the ADC is in control of the at least one continuous-process drilling parameter the ADC may use the available measurement data to provide automatic and/or closed-loop control of the at least one continuous-process drilling parameter. The available measurement data sent from the DCS may comprise time-continuous signals, and the control signals received from the ADC may comprise time-continuous signals; these time-continuous signals may be exchanged between the DCS and the basic control loops for the drilling process. The ADC or the external safety system may, based on or in response to the available measurement data, generate and sent to the DCS safety signals related to downhole conditions. The safety signals may relate to functions (safety functions) for reducing the risk, probability or consequence of undesirable downhole events or conditions. Limitation of the axial movement of the drillstring to avoid detrimental surges or swab pressures is one example of such a safety function; another example is limitation of the flow rate to the drillstring for avoiding overpressure downhole. The safety signals may comprise a probability of, or a consequence of, undesirable downhole events or conditions.

Whereas control of the main downhole continuous-process drilling parameters (e.g., vertical velocity, rotational velocity, pump rate) is applied by the ADC only when the ADC is active, the downhole conditions-related safety signals generated by the ADC or the external safety system may be used for reducing the risk of damage to the well due to unexpected changes in conditions; in particular, additional functions based on the safety signals may be active at all times, including when the ADC is inactive. Limitation of the axial movement of the drillstring to avoid detrimental surges or swab pressures is one example of such an additional function; another example is limitation of the flow rate to the drillstring for avoiding overpressure downhole.

The DCS may receive the safety signals related to downhole conditions from the ADC or the external safety system, and in response to or based on the safety signals related to downhole conditions the DCS may take back control of the at least one continuous-process drilling parameter from the ADC; in this case the DCS ceases outputting the control signals provided by the ADC. Alternatively, the DCS may temporarily limit the control signals provided by the ADC and outputted by the DCS based on the safety signals related to downhole conditions.

The DCS is able to take back control of the at least one continuous-process drilling parameter from the ADC based on or in response to safety limits applied by the DCS or safety signals received from external safety systems, where the safety limits applied by the DCS and/or the safety signals received from external safety systems relate to the safety of topside drilling machines and/or people. Alternatively, the DCS may limit the control signals received from the ADC and outputted by the DCS based on or in response to the safety limits applied by the DCS or safety signals received from external safety systems.

It is noted that although all control signals from the ADC for controlling the at least one continuous-process drilling parameter will typically be applied via the DCS (and some control signals/commands, hoisting commands for example, are required to be applied via the DCS, because of the stronger machine safety requirements for hoisting equipment), the at least one continuous-process drilling parameter may be controlled directly by the ADC; that is, the ADC may output control signals for controlling the at least one continuous-process drilling parameter. The direct application of control signals from the ADC to drilling machines may be applicable when the machine/equipment is not normally operated by the DCS (for example, in managed pressure drilling operations), or the drilling control system is old and unable to receive the control signals from the ADC.

If the "completed" signal received from the ADC at the ADC/DCS interface of the DCS is true, control of the at least one continuous-process drilling parameter is relinquished back from the ADC to the DCS; this means that the outputting of control signals received from the ADC is ceased, and only control signals generated by the DCS are subsequently outputted for controlling the borehole drilling process.

Figure 2:
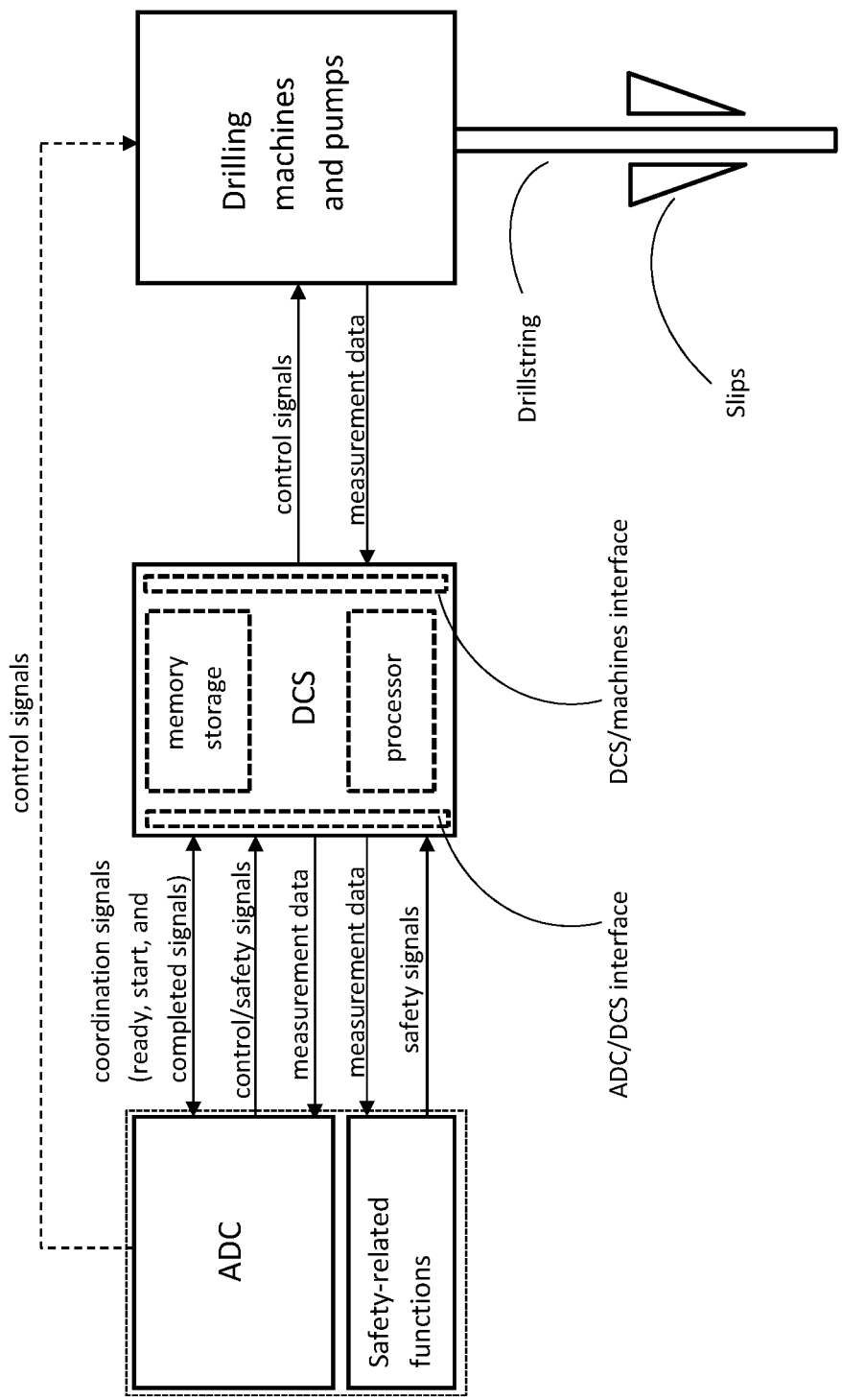
FIG. 2 illustrates schematically the ADC, the DCS and the drilling machines and pumps, and the signals and data exchanged.

FIG. 2 illustrates the relationship between the ADC, the DCS and the drilling machines and the signals that are sent between these entities. Coordination signals may be shared between the ADC and the DCS. Control signals are outputted from the DCS to control the borehole drilling process; before control is delegated from the DCS to the ADC, the outputted control signals are generated by the DCS at a processor of the DCS, and after control is delegated from the DCS to the ADC, control signals received from the ADC at the DCS (or at the ADC/DCS interface at the DCS) are outputted. Measurement data and other data may be stored in the memory storage of the DCS. Control signals may be received directly at the drilling machines and pumps from the ADC. Measurement data from the drilling machines and pumps may be received at the DCS/machines interface of the DCS, and the DCS may provide the available measurement data to the ADC or the external safety system by sending the available measurement data from the ADC/DCS interface of the DCS. The ADC or the external safety system may send safety signals to the DCS.

It will be appreciated by the person of skill in the art that various modifications may be made to the above described embodiments without departing from the scope of the present invention.

The invention claimed is:

1. A method of controlling a borehole drilling process implemented in a drilling control system for controlling a first set of operations and a second set of operations, the method comprising:
generating and outputting at least one control signal by the drilling control system for controlling at least one control parameter associated with the first set of operations, such that the at least one control parameter associated with the first set of operations is controlled by the drilling control system; and
subsequent to an indication that the first set of operations is complete, outputting at least one control signal received from an external system at the drilling control system for controlling at least one control parameter associated with the second set of operations, such that the at least one control parameter associated with the second set of operations is controlled by the external system, wherein the at least one control signal received from the external system is generated by the external system,
wherein the first set of operations consists of batch tasks, and the second set of operations consists of downhole processes, and
wherein the indication that the first set of operations is complete comprises one or more of:
an indication that a drillstring is connected to one or more drilling machines;
an indication that a drillstring has been released from slips and the drillstring has been lifted out of slips; and
an indication that a flow path from one or more pumps is open.

2. The method of claim 1, wherein the first set of operations is performed while a drillstring is held in slips.

3. The method of claim 1, wherein the second set of operations is performed while a drillstring is not held in slips.

4. The method of claim 1, further comprising, prior to outputting the at least one control signal received from the external system, sending a start signal to the external system, wherein the start signal is set to True.

5. The method of claim 4, wherein the True start signal comprises a request to the external system to send at least one control signal for controlling at least one control parameter associated with the second set of operations, and a promise to the external system that the first set of operations is complete.

6. The method of claim 1, further comprising, prior to outputting the at least one control signal received from the external system, receiving at the drilling control system a ready signal from the external system, wherein the ready signal is set to True, and the True ready signal indicates that the external system is active and is able to provide at least one control signal.

7. The method of claim 1, wherein the at least one control parameter associated with the second set of operations comprises at least one of:
vertical velocity of a drillstring;
rotational velocity of a drillstring; and
fluid flow rate at a top-of-string position.

8. The method of claim 1, further comprising ceasing the outputting of the at least one control signal received from the external system subsequent to receiving at the drilling control system a complete signal from the external system, wherein the complete signal is set to True, and the True complete signal indicates that the second set of operations is complete.

9. The method of claim 1, wherein the drilling control system does not filter the at least one control signal received from the external system.

10. The method of claim 1, wherein the drilling control system is configured to apply one or more safety limits to control signals outputted by the drilling control system.

11. The method of claim 10, wherein the one or more safety limits relate to the safety of one or more topside drilling machines and/or pumps.

12. The method of claim 10, wherein the drilling control system is configured to cease the outputting of, or temporarily limit, the at least one control signal received from the external system based on or in response to the at least one control signal received from the external system exceeding the one or more safety limits applied by the drilling control system.

13. The method of claim 1, further comprising sending by the drilling control system measurement data relating to the second set of operations to the external system or an external safety system.

14. The method of claim 13, further comprising receiving at the drilling control system one or more safety signals from the external system or the external safety system, wherein the one or more safety signals are related to the second set of operations and are based at least in part on the measurement data sent by the drilling control system.

15. The method of claim 14, wherein the one or more safety signals received from the external system or the external safety system relate to functions that reduce the risk, probability, or consequence of undesirable downhole events or conditions.

16. The method of claim 14, further comprising ceasing the outputting of, or temporarily limiting, the at least one control signal received from the external system based on or in response to the one or more safety signals received from the external system or the external safety system.

17. A drilling control system for controlling a borehole drilling process, the borehole drilling process comprising a first set of operations and a second set of operations, the apparatus comprising:
a control unit for generating at least one control signal for controlling at least one control parameter associated with the first set of operations; and
an output unit for outputting said at least one control signal to a borehole drilling apparatus, such that the at least one control parameter associated with the first set of operations is controlled by the drilling control system,
wherein the drilling control system is configured, subsequent to an indication that the first set of operations is complete, to output at least one control signal received from an external system at the drilling control system for controlling at least one control parameter associated with the second set of operations, such that the at least one control parameter associated with the second set of operations is controlled by the external system, wherein the at least one control signal received from the external system is generated by the external system,
wherein the first set of operations consists of batch tasks, and the second set of operations consists of downhole processes, and wherein the indication that the first set of operations is complete comprises one or more of:
an indication that a drillstring is connected to one or more drilling machines;
an indication that a drillstring has been released from slips and the drillstring has been lifted out of slips; and
an indication that a flow path from one or more pumps is open.

* * * * *